United States Patent [19]

McMahon, II

[11] Patent Number: 4,547,125
[45] Date of Patent: Oct. 15, 1985

[54] WIND TURBINE

[76] Inventor: Elihu H. McMahon, II, 1870 Schieffelin Ave., Bronx, N.Y. 10466

[21] Appl. No.: 561,949

[22] Filed: Dec. 15, 1983

[51] Int. Cl.[4] .............................................. F03D 3/06
[52] U.S. Cl. .................................. 416/117; 416/132 R
[58] Field of Search ................... 416/117, 118, 132 R, 416/17

[56] References Cited

U.S. PATENT DOCUMENTS

| | | | |
|---|---|---|---|
| 469,786 | 3/1892 | Irrgang | 416/117 |
| 609,378 | 8/1898 | Weitzel | 416/118 |
| 749,806 | 1/1904 | Rue | 416/117 X |
| 797,140 | 8/1905 | Miller | 416/117 X |
| 910,342 | 1/1909 | Wood | 416/117 X |
| 1,019,974 | 3/1912 | Lindsey | 416/17 |
| 1,087,586 | 2/1914 | Ivancevich | 416/117 X |
| 1,371,204 | 3/1921 | Holt | 416/118 |
| 3,321,022 | 5/1967 | Oguri | 416/240 X |
| 4,037,989 | 7/1977 | Huther | 416/197 A |
| 4,142,832 | 3/1979 | Clifton | 416/117 |
| 4,209,281 | 6/1980 | Edmunds | 416/197 A |

FOREIGN PATENT DOCUMENTS

| | | | |
|---|---|---|---|
| 324937 | 4/1903 | France | 416/117 |
| 998721 | 1/1952 | France | 416/117 |
| 1038498 | 9/1953 | France | 416/117 |
| 2290583 | 6/1976 | France | 416/117 |
| 7709234 | 2/1979 | Netherlands | 416/117 |
| 78052 | 6/1931 | Sweden | 416/117 |

Primary Examiner—Everette A. Powell, Jr.
Attorney, Agent, or Firm—Jacobs & Jacobs

[57] ABSTRACT

A wind turbine, having
(a) at least one pair of sail means, each said sail means having upper and lower portions hingedly connected together to permit said portions to move away from and towards each other to thus open and close, respectively, said sail means being in the shape of an airfoil;
(b) a vertical shaft,
(c) a support,
(d) means mounting said vertical shaft in said support for rotation about the vertical axis of said shaft; and
(e) means mounting said sail means to said shaft, said sail means being disposed to move under the action of the wind in a plane about said vertical axis; said mounting means for said sail means including means for opening and closing one sail means of each pair of sail means while the other sail means of said pair is closed and opened, respectively, as said sail means moves about said vertical axis in said plane, said mounting means for said sail means being operable to dispose said plane at a predetermined angle to the horizontal and being adjustable to change said angle as desired.

1 Claim, 4 Drawing Figures

WIND TURBINE

The present invention relates to a wind turbine having a vertical shaft driven by at least one pair of substantially horizontally disposed sails. The sails are made of two parts, hingedly connected together, which open and close as they rotate under the action of the wind.

While the invention is primarily directed to a wind turbine, the apparatus of the invention is operable under any fluid forces, such as water.

Figure 1:
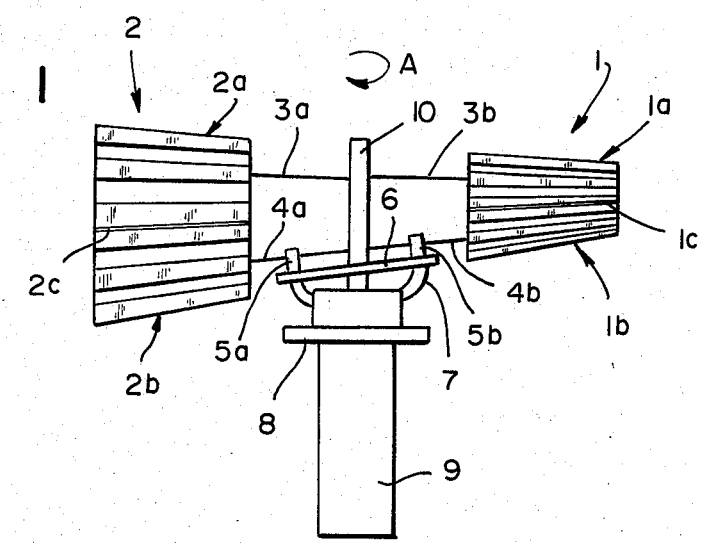
FIG. 1 is a side elevational view of the turbine of the present invention.

Referring to the drawings, the turbine of the invention is shown in FIG. 1 as comprising sails 1, 2 carried by upper struts 3a, 3b and lower struts 4a, 4b. Sails 1, 2 each have an upper portion 1a, 2a and a lower portion 1b, 2b connected by hinged joint 1c, 2c, respectively. Lower struts 4a, 4b carry a roller 5a, 5b, respectively, which ride on an annular track 6 as will be described in detail hereinafter. Track 6 is carried by a semi-circular support 7 which is mounted in housing 8, which is in turn supported by base 9. Struts 3a, 3b, 4a, 4b are mounted within upper housing 10.

Figure 2:
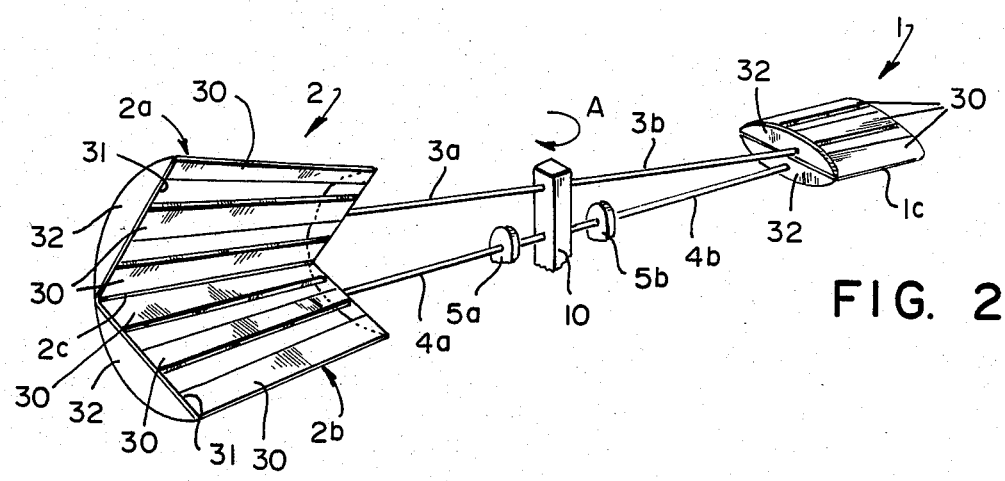
FIG. 2 is a detail view, in perspective, of the turbine of the invention.

Assuming that the wind is blowing into the drawing as viewed in FIG. 1, the sails 1,2 will be rotated in the direction shown by arrow A. Hinged joint 1c then becomes the leading edge of sail 1. See FIG. 2.

Figure 3:
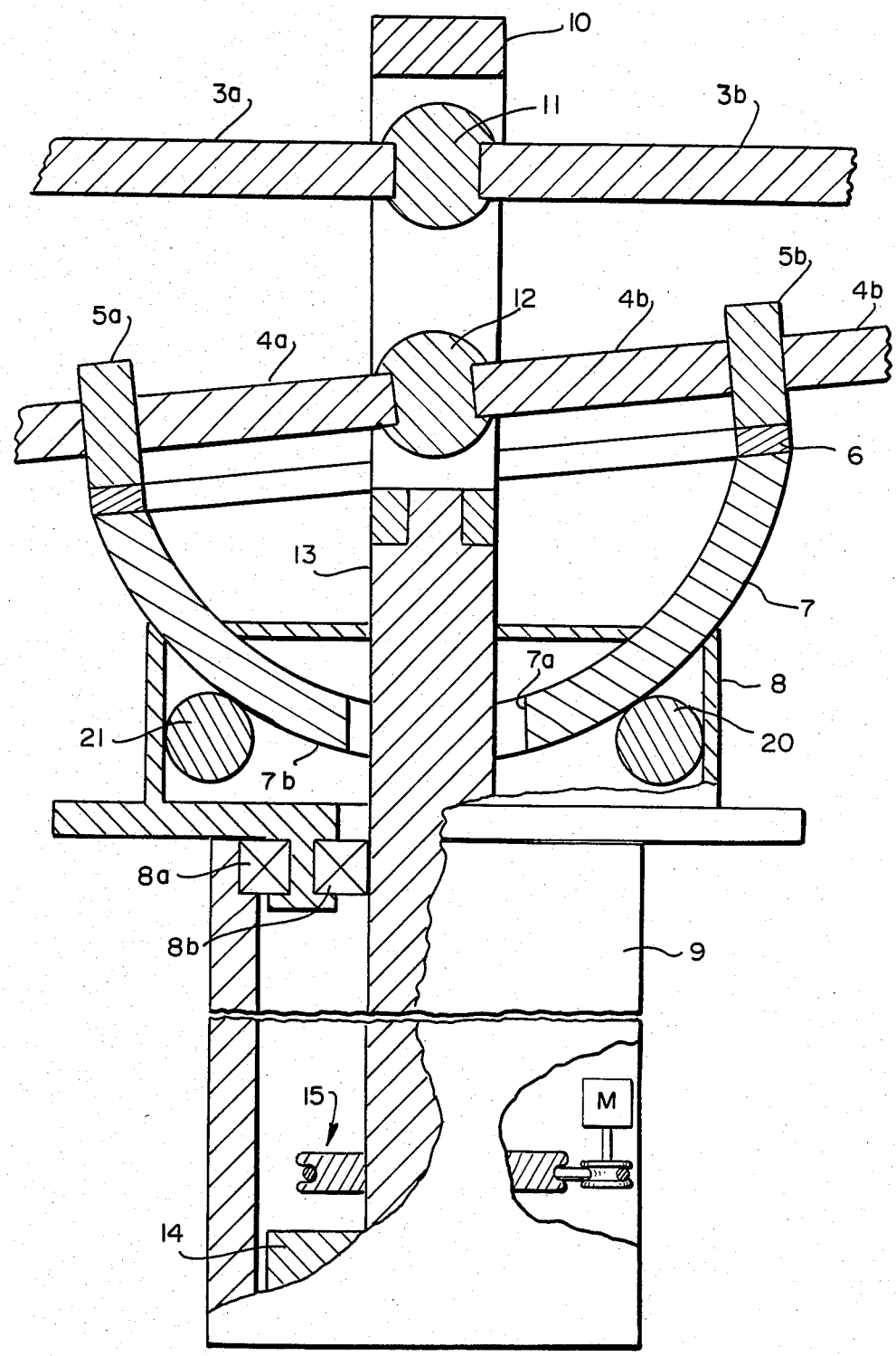
FIG. 3 is a detail view with parts broken away, of the turbine of the invention.

Referring now to FIG. 3, it can be seen that upper struts 3a, 3b are mounted in upper roller 11 and lower struts 4a, 4b, are mounted in lower roller 12 which are in turn mounted within upper housing 10 by means (not shown) allowing for rotation of rollers 11, 12 about their longitudinal axis.

Upper housing 10 is secured to a shaft 13 that extends through housing 8, through slot 7a in support 7 and through base 9. A flywheel 14 is mounted to shaft 13 at the bottom thereof and a pulley and belt assembly 15 transmits the rotational movement of shaft 13 to motor M.

Support 7 rests on gears 20, 21 and the lower surface 7b of support 7 is provided with gear teeth that mesh with gears 20, 21. Gear 20 is manually operated by a gear shaft (not shown) projecting from housing 8. Gear 21 is an idler gear. By rotation of gear 20, the inclination of track 6 to the horizontal can be changed to any desired angle.

Referring now to FIG. 1, assuming that the wind is blowing into the plane of the drawing, sails 1,2 will move along a circular path in the direction shown by arrow A. As strut 4a rides up the inclined track 6, sail 2 will close. Conversely, as strut 4b rides down the inclined track 6, the sail 1 will open. Of course, as the sails 1,2 are moved by the wind, the housing 10 and shaft 13 will rotate, thereby providing power to motor M via pulley and belt assembly 15. Flywheel 14 acts as an inertial device to maintain even rotation of shaft 13, as is known.

Housing 8 is mounted for rotation via annular bearings 8a, 8b (FIG. 3). Housing 8 is connected to means (not shown) that will maintain the housing 8 stationary with respect to the direction of the wind with the plane containing support 7 perpendicular to the wind direction. A tail vane or similar mechanical or electrical device may be used, as is known.

It is to be noted that sails 1,2 are composed of a plurality of spaced apart panels 30 that provide a plurality of slots 31. The frame 32 of each sail 1,2 has the shape of an airfoil, as shown.

Figure 4:
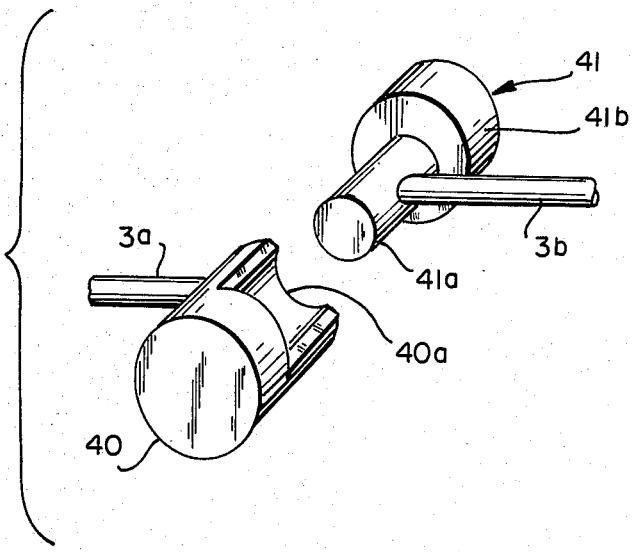
FIG. 4 is an exploded view, in perspective, of an alternative means for pivotally mounting the upper struts.

Preferably, struts 3a and 3b will be mounted on separate, coaxial rollers as shown in FIG. 4 instead of being mounted on the unitary roller 11.

Also, the leading edges 1c, 2c may be provided with vent means (not shown) to allow the wind to pass through the opened sail.

The two-sail turbine shown in the drawings, operates on the principle of pulling each sail 1,2 about the vertical axis of the shaft 13 due to the formation of vacuum regions behind the sails 1,2. Each sail 1,2 comprises slotted fabric laid across a frame, such as a wooden frame, which supplies rigidity and evenly distributes forces acting on the sails. As described above, sails 1,2 open and close during their rotational movement.

The air stream passing through the slots on the open sail has the characteristics of high speed and low pressure. The air behind the surface of the open sail moves slower and has greater pressure. It is a natural tendency for the air molecules to go from the high pressure region behind the surfaces of the sail to the low pressure region behind the partitions. As air vacates the regions behind the sail surfaces, vacuums are formed behind the slotted surfaces. Ultimately the sail moves to fill these vacuum regions. Hence, it is the pressure differential which gives rise to rotation; the sails are not simply propelled by air blowing against their inner surface.

The slots play another important role. The cross-section of the closed sail has the shape of an airfoil. This reduces instead of increasing air deflection. The slots have the effect of smoothing out the airflow behind the collapsed sail; consequently, turbulence is reduced. The airfoil shape also gives the closed sail lift, thereby reducing incline resistance with respect to the rotor's angular centerwheel.

In practice, the angle between track 6 and the horizontal will be an inverse function of the velocity of the wind. At a wind velocity of more than 50 mph, track 6 will be horizontal and the turbine will be rendered inoperative. As the velocity of the wind decreases, the angle of inclination of track 6 will be increased. It is an advantage of the present invention that the turbine can be used at wind velocities as low as about 3 or 4 mph with good efficiency.

FIG. 4 shows the upper struts 3a, 3b independently pivotally mounted on coaxial rollers 40, 41, respectively, which as a unit replace roller 11 of FIG. 3. Roller 40 has a portion thereof cut away to form a mating recess 40a to receive a complementary hub 41a projecting from main body portion 41b. Recess 40a is large enough to accommodate the maxium deflection of each strut 3a, 3b relative to the other. As shown, strut 3b is secured to hub 41a and strut 3a is secured to the exterior of roller 40 such that struts 3a, 3b are coaxial in their normal, undeflected position.

I claim:

1. A wind turbine, having
    (a) at least one pair of sail means, each said sail means being in the shape of an airfoil and having upper and lower portions hingedly connected together to permit said portions to move away from and towards each other to thus open and close, respectively, each of said upper and lower portions having slots formed therein, said slots extending transversely of the direction of the wind when a said sail means is disposed facing toward or away from the wind;
(b) a vertical shaft;
(c) a support;
(d) means mounting said vertical shaft in said support for rotation about the vertical axis of said shaft;
(e) means mounting said sail means to said vertical shaft such that said sail means is disposed to move under the action of the wind in a plane about said vertical axis; and
(f) said mounting means for said sail means including operating means for opening and closing one sail means of each pair of sail means while the other sail means of said pair is closed and opened, respectively, as said sail means moves about said vertical axis in said plane, said mounting means for said sail means being operable to dispose said plane at a predetermined angle to the horizontal and being adjustable to change said angle as desired.

* * * * *